US012293304B1

(12) United States Patent
Jammalamadaka et al.

(10) Patent No.: US 12,293,304 B1
(45) Date of Patent: May 6, 2025

(54) DECISION RECOMMENDATION VIA CAUSAL FEATURE DISPLAY

(71) Applicant: HRL Laboratories, LLC, Malibu, CA (US)

(72) Inventors: Aruna Jammalamadaka, Camarillo, CA (US); Rajan Bhattacharyya, Sherman Oaks, CA (US); Samuel D. Johnson, Santa Monica, CA (US); Rashmi N. Sundareswara, Topanga, CA (US)

(73) Assignee: HRL LABORATORIES, LLC, Malibu, CA (US)

(*) Notice: Subject to any disclaimer, the term of this patent is extended or adjusted under 35 U.S.C. 154(b) by 1023 days.

(21) Appl. No.: 17/325,082

(22) Filed: May 19, 2021

Related U.S. Application Data

(60) Provisional application No. 63/105,665, filed on Oct. 26, 2020.

(51) Int. Cl.
  *G06N 5/04* (2023.01)
  *G06N 7/01* (2023.01)
  *G06N 20/00* (2019.01)

(52) U.S. Cl.
  CPC ............ *G06N 5/04* (2013.01); *G06N 7/01* (2023.01); *G06N 20/00* (2019.01)

(58) Field of Classification Search
  CPC .......... G06N 5/04; G06N 5/045; G06N 20/00; G06N 7/01
  USPC .................................. 706/11, 12, 45, 46, 52
  See application file for complete search history.

(56) References Cited

U.S. PATENT DOCUMENTS

| | | | | |
|---|---|---|---|---|
| 2011/0307437 | A1* | 12/2011 | Aliferis | G06N 20/00 706/46 |
| 2015/0317337 | A1* | 11/2015 | Edgar | G16H 50/70 707/751 |
| 2017/0120902 | A1* | 5/2017 | Kentley | B60W 10/18 |
| 2017/0248964 | A1* | 8/2017 | Kentley | G01S 7/4972 |
| 2019/0009133 | A1* | 1/2019 | Mettler May | G09B 19/0038 |
| 2019/0250617 | A1* | 8/2019 | Ford | G05D 1/0212 |
| 2019/0310100 | A1* | 10/2019 | Yang | G01C 21/3461 |
| 2019/0369637 | A1* | 12/2019 | Shalev-Shwartz | G06V 20/56 |

(Continued)

OTHER PUBLICATIONS

Chalupka et al., "Visual Causal Feature Learning", arXiv ID: 1412.2309, Jun. 4, 2015. (Year: 2015).*

(Continued)

*Primary Examiner* — Hwei-Min Lu
(74) *Attorney, Agent, or Firm* — TOPE-MCKAY & ASSOCIATES

(57) ABSTRACT

Described is a system for generating and displaying decision recommendations. The system receives historical observations and courses of action corresponding to the historical observations. A conditional density between the historical observations and the courses of action is estimated, and the historical observations are clustered according to the conditional density to obtain observational clusters. Observational clusters are merged to determine a causal partition having corresponding causal features which map to various courses of action. A new observation is mapped to the causal partition and a ranking of courses of action for the new observation is computed. A visualization of causal features and a ranking of courses of actions corresponding to the new observation is provided to a display.

17 Claims, 14 Drawing Sheets

(56) References Cited

U.S. PATENT DOCUMENTS

| | | | | |
|---|---|---|---|---|
| 2020/0160189 | A1* | 5/2020 | Bhattacharjya | G06N 5/022 |
| 2020/0342262 | A1* | 10/2020 | Feng | G06N 7/01 |
| 2021/0142190 | A1* | 5/2021 | Isahagian | G06N 5/04 |
| 2021/0256406 | A1* | 8/2021 | Mueller | G06N 7/01 |
| 2022/0004910 | A1* | 1/2022 | Wei | G06N 20/10 |

OTHER PUBLICATIONS

Chalupka et al., "Multi-Level Cause-Effect Systems", arXiv ID: 1512.07942, Dec. 25, 2015. (Year: 2015).*

Spirtes et al., "Causal discovery and inference: concepts and recent methodological advances", Applied Informatics, 3:3, Feb. 18, 2016. (Year: 2016).*

Lopez-Paz et al., "Discovering Causal Signals in Images", arXiv ID: 1605.08179, Oct. 31, 2017. (Year: 2017).*

Leon et al., "A Review of Tracking, Prediction and Decision Making Methods for Autonomous Driving", arXiv ID: 1909.07707, pub. date: Sep. 17, 2019. (Year: 2019).*

Nair et al., "Causal Induction from Visual Observations for Goal Directed Tasks", arXiv ID:1910.01751, Oct. 3, 2019. (Year: 2019).*

Guo et al., "A Survey of Learning Causality with Data: Problems and Methods", arXiv ID: 1809.09337, May 5, 2020. (Year: 2020).*

Jansen et al., "Context-Based Vessel Trajectory Forecasting: A Probabilistic Approach Combining Dynamic Bayesian Networks with an Auxiliary Position Determination Process", 2020 IEEE 23rd International Conference on Information Fusion (Fusion), Jul. 2020, pp. 1-10. (Year: 2020).*

Jin et al., "Visual Causality Analysis of Event Sequence Data", arXiv ID: 2009.00219, Sep. 1, 2020. (Year: 2020).*

Chalupka, Krzysztof, Pietro Perona, and Frederick Eberhardt. "Visual causal feature learning." Proceedings of the Thirty-First Conference on Uncertainty in Artificial Intelligence. AUAI Press, 2015, pp. 1-10.

Chalupka K, Bischoff T, Perona P, Eberhardt F. "Unsupervised discovery of el Niño using causal feature learning on microlevel climate data." Proceedings of the thirty-second conference on uncertainty in artificial intelligence, 2016, pp. 1-10.

Chalupka, Krzysztof et al. "Causal feature learning: an overview." Behaviormetrika 44.1, 2017, pp. 137-164.

Chen, Tianqi and Guestrin, Carlos. "XGBoost: A Scalable Tree Boosting System." KDD '16: Proceedings of the 22nd ACM SIGKDD International Conference on Knowledge Discovery and Data Mining, 2016, pp. 785-794.

Isabelle Guyon, Alexander Statnikov, and Berna Bakir Batu. Cause Effect Pairs in Machine Learning, Chapter 7. Springer, 2019, pp. 237-256.

Hartigan, J. A. and Wong, M. A. "Algorithm AS 136: A K-Means Clustering Algorithm." Journal of the Royal Statistical Society, Series C, 1979, 28(1): pp. 100-108.

Lundberg, S.M., Erion, G., Chen, H. et al. "From local explanations to global understanding with explainable AI for trees." Nat Mach Intell, 2020, 2, pp. 56-67.

Ester, Martin, et al. "A density-based algorithm for discovering clusters in large spatial databases with noise." Proceedings of the Second International Conference on Knowledge Discovery and Data Mining, 1996, pp. 226-231.

Van der Maaten, L.J.P.; Hinton, G.E. "Visualizing data using t-SNE." Journal of Machine Learning Research, 2008, 9: pp. 2579-2605.

Rokach, Lior, and Oded Maimon. "Clustering methods." Data mining and knowledge discovery handbook. Springer US, 2005. pp. 321-352.

Marx, A and Vreeken, J. "Causal inference on multivariate and mixed type data." Proceedings of the European Conference on Machine Learning and Principles and Practice of Knowledge Discovery in Data (ECMLPKDD), Springer, 2018, pp. 655-671.

Lundberg, S.M., et al. "From local explanations to global understanding with explainable AI for trees." Nature Machine Intelligence, 2020, 2: pp. 56-67.

Bach, S., et al. "On pixel-wise explanations for non-linear classifier decisions by layer-wise relevance propagation." Plos One, 2015, pp. 3-7.

* cited by examiner

| Feature | Examples |
|---|---|
| Heading |  |
| Distance |  |
| Intercept angle |  |
| Distance to course |  |
| Flag |  |

DECISION RECOMMENDATION VIA CAUSAL FEATURE DISPLAY

GOVERNMENT LICENSE RIGHTS

This invention was made with government support under U.S. Government Contract Number N00014-19-C-2024. The government may have certain rights in the invention.

CROSS-REFERENCE TO RELATED APPLICATIONS

This is a Non-Provisional Application of U.S. Provisional Patent Application No. 63/105,665, filed Oct. 26, 2020, entitled "Decision Recommendation Via Causal Feature Display", the entirety of which is incorporated herein by reference.

BACKGROUND OF INVENTION

(1) Field of Invention

The present invention relates to a system for learning features which are causal of decisions and, more particularly, to a system for learning features which are causal of decisions and displaying decision recommendations based on the learned features.

(2) Description of Related Art

Interpretable machine learning refers to extracting human understandable insights from a machine learning model. Further, explainable artificial intelligence, or XAI, refers to method and techniques in the application of AI technology such that the results of the solution can be understood by humans. While XAI models, such as SHAP(SHapley Additive explanations) features (see Literature Reference No. 12 of the List of Incorporated Literature References) or Layerwise Relevance Propagation (see Literature Reference No. 13), attempt to explain the causal reasoning of a (potentially flawed or biased) machine learning model, causal feature learning aims to explain the causal reasoning inherent in the real-world data generation process.

Standard machine learning models can predict an optimal course of action. Correlation machine learning methods have been used for decision making, but they are limited by the statistics, bias, or sampling errors of the training dataset. The difference between causal and correlational features derived by machine learning methods is that a causal model removes the effects of confounding variables in the estimation of the optimal course of action (COA) and captures a generative relationship between the observed data and COA. That is, for any given input in the space of observations, one is able to determine the correct COA. The benefit of this is that the model is no longer limited by the statistics, bias, or sampling errors of the training dataset and, therefore, produces more robust and accurate predictions on previously unseen, future, and partial datasets.

Thus, a continuing need exists for a system that discovers causal factors for COA selection and presents decision recommendations via an interpretable user display.

SUMMARY OF INVENTION

The present invention relates to a system for learning features which are causal of decisions and, more particularly, to a system for learning features which are causal of decisions and displaying decision recommendations based on the learned features. The system comprises one or more processors and a non-transitory computer-readable medium having executable instructions encoded thereon such that when executed, the one or more processors perform multiple operations. The system receives a set of historical observations X and a set of courses of action Y corresponding to the set of historical observations X. A conditional density $P(Y|X)$ between the set of historical observations X and the set of courses of action Y is estimated, and the set of historical observations X are clustered according to $P(Y|X)$, thereby obtaining a plurality of observational clusters. Observational clusters are merged to determine a causal partition having corresponding causal features which map to various courses of action. A new observation is mapped to the causal partition and a ranking of courses of action for the new observation is computed. A visualization of a plurality of causal features and a ranking of courses of actions corresponding to the new observation is provided to a display.

In another aspect, the system causes a mobile platform to physically maneuver to perform a highest rank course of action.

In another aspect, the causal partition is determined by refining a set of decision boundaries via user feedback on potential causal features to derive the plurality of causal features for ranking the courses of action.

In another aspect, the causal partition is determined by refining a set of decision boundaries about a relationship between the set of observed data X and the set of courses of action Y.

In another aspect, the causal partition comprises a plurality of partition cells, and wherein the one or more processors further perform an operation of providing a visualization of the causal features which characterize each partition cell.

In another aspect, the visualization comprises a graphical display of causal importance of the causal features.

In another aspect, the graphical display comprises a plurality of pictographs representing the causal features.

Finally, the present invention also includes a computer readable program and a computer implemented method. The computer readable program includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
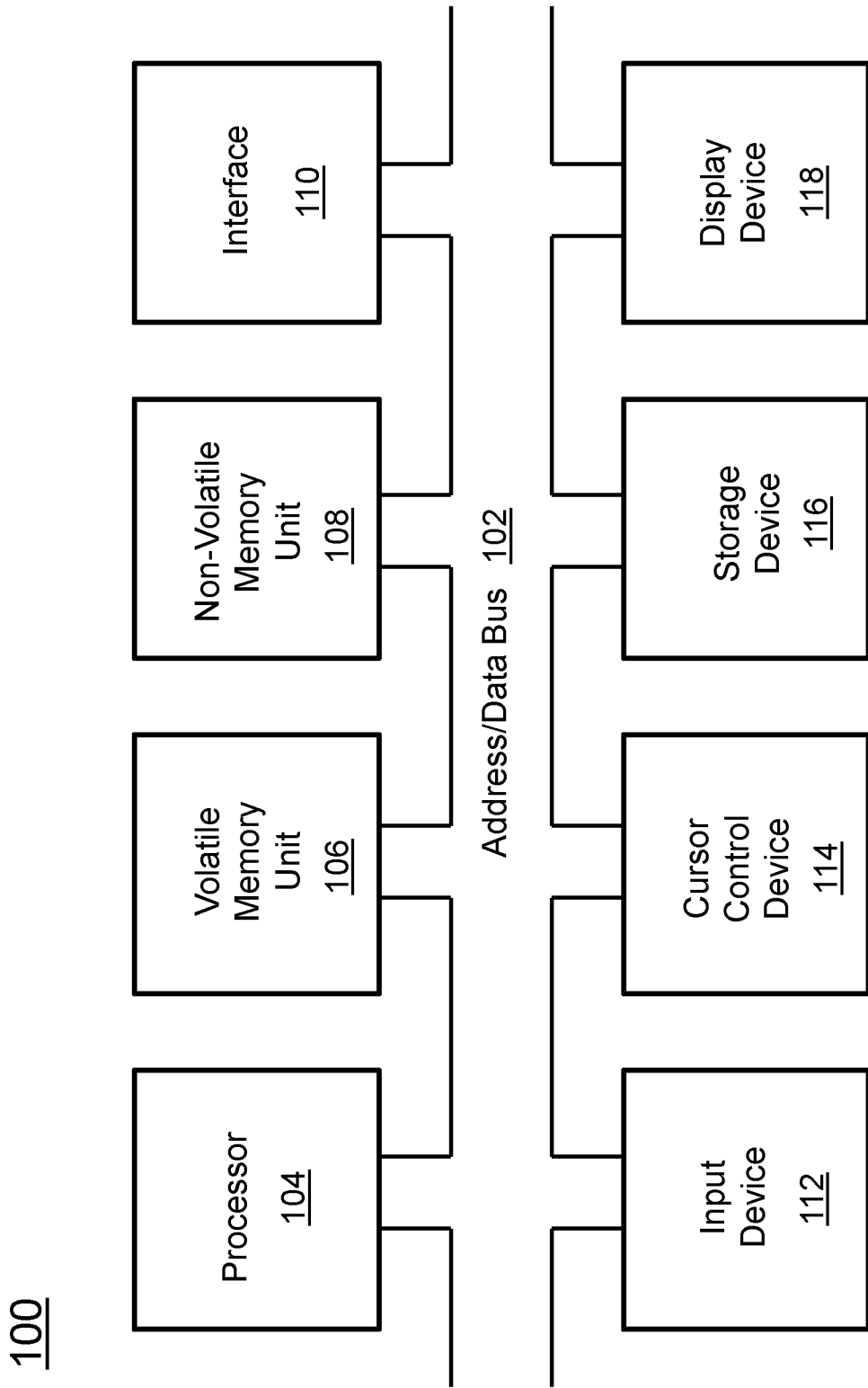
FIG. 1 is a block diagram depicting the components of a system for learning features which are causal of decisions and displaying decision recommendations based on the learned features according to some embodiments of the present disclosure.

The present invention relates to a system for learning features which are causal of decisions and, more particularly, to a system for learning features which are causal of decisions and displaying decision recommendations based on the learned features. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Chalupka, Krzysztof, Pietro Perona, and Frederick Eberhardt. "Visual causal feature learning." Proceedings of the Thirty-First Conference on Uncertainty in Artificial Intelligence. AUAI Press, 2015.
2. Chalupka K, Bischoff T, Perona P, Eberhardt F. "Unsupervised discovery of el Niño using causal feature learning on microlevel climate data." Proceedings of the thirty-second conference on uncertainty in artificial intelligence, 2016.
3. Chalupka, Krzysztof et al. "Causal feature learning: an overview." Behaviormetrika 44.1, 2017, 137-164.
4. Chen, Tianqi and Guestrin, Carlos. "XGBoost: A Scalable Tree Boosting System." KDD '16: Proceedings of the 22nd ACM SIGKDD International Conference on Knowledge Discovery and Data Mining, 2016, 785-794.
5. Isabelle Guyon, Alexander Statnikov, and Berna Bakir Batu. Cause Effect Pairs in Machine Learning, Chapter 7. Springer, 2019.
6. Hartigan, J. A. and Wong, M. A. "Algorithm AS 136: A K-Means Clustering Algorithm." Journal of the Royal Statistical Society, Series C, 1979, 28 (1): 100-108.
7. Lundberg, S. M., Erion, G., Chen, H. et al. "From local explanations to global understanding with explainable AI for trees." Nat Mach Intell, 2020, 2, 56-67.
8. Ester, Martin, et al. "A density-based algorithm for discovering clusters in large spatial databases with noise." Proceedings of the Second International Conference on Knowledge Discovery and Data Mining, 1996, 226-231.
9. van der Maaten, L. J. P.; Hinton, G. E. "Visualizing data using t-SNE." Journal of Machine Learning Research, 2008, 9:2579-2605.
10. Rokach, Lior, and Oded Maimon. "Clustering methods." Data mining and knowledge discovery handbook. Springer US, 2005. 321-352.
11. Marx, A and Vreeken, J. "Causal inference on multivariate and mixed type data." Proceedings of the European Conference on Machine Learning and Principles and Practice of Knowledge Discovery in Data (ECMLPKDD), Springer, 2018.
12. Lundberg, S. M., et al. "From local explanations to global understanding with explainable AI for trees." Nature Machine Intelligence, 2020, 2:56-67.
13. Bach, S., et al. "On pixel-wise explanations for non-linear classifier decisions by layer-wise relevance propagation." PLOS ONE, 2015, 3-7.

(2) Principal Aspects

Various embodiments of the invention include three "principal" aspects. The first is a system for learning features which are causal of decisions and displaying decision recommendations based on the learned features. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer readable program. The computer readable program generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within one or more computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices, such as autonomous platforms) can be associated with one or more associated memories, where each associated memory is a non-transitory computer-readable medium. Each associated memory can be associated with a single processor 104 (or device), or a network of interacting processors 104 (or devices), such as a network of autonomous platforms (e.g., autonomous vehicles, robots).

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
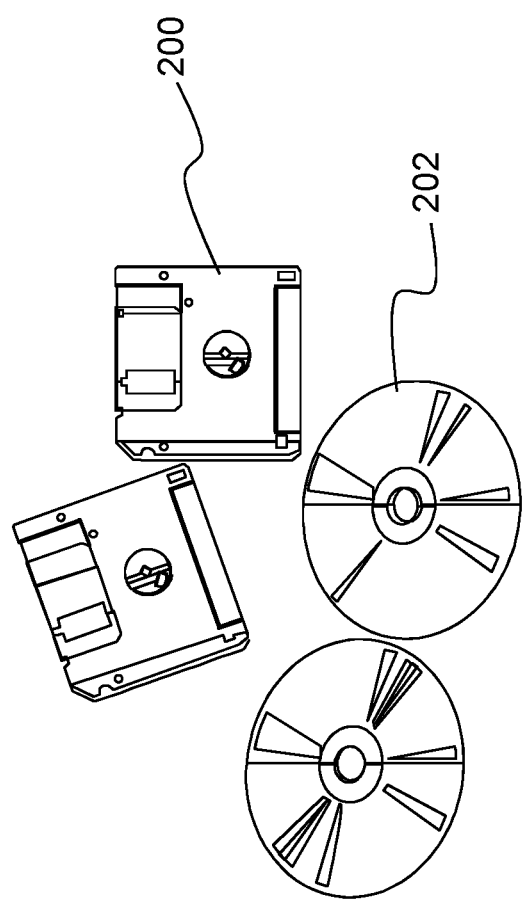
FIG. 2 is an illustration of a computer readable program according to some embodiments of the present disclosure.

An illustrative diagram of a computer readable program (i.e., storage device) embodying the present invention is depicted in FIG. 2. The computer readable program is depicted as floppy disk 200 or an optical disk 202 such as a CD or DVD. However, as mentioned previously, the computer readable program generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a decision recommendation system that takes as input large amounts of high-dimensional data from multiple intelligence sources, such as radar, satellite images, and weather patterns, and commander decisions made from that data (e.g., navigational courses of action), and learns the features which are causal of that decision in an offline training stage. During deployment, the system takes input from those same sources and displays a ranked list of recommendations, for a discrete set of decisions, and highlighted (or emphasized) regions in the input data which delineate causal factors for those decisions. Currently, Logistics Readiness Center (LRC) commanders receive approximately sixty-six layers of information which they must use to make logistic decisions. In contrast, the invention described herein is a system constructed to ingest large amounts of highly multi-dimensional data (multi-INT) that is difficult for decision makers to forage through, evaluate, and build models through manual efforts. With the present invention, the user may "drill down" into any given layer of data to observe the validity and confidence of the causal factors being used to derive the decision ranking. In other words, a new input observation is fed into the system described herein, a ranking of decisions by optimality criterion is produced, and then a user may click (or "drill down") on a specific decision to see the highlighted features in the input observation which caused that decision to be optimal. These features are critical transparency measures for machine-aided decision making, especially in military scenarios. In one embodiment, the system described herein is used for naval command decision-making, specifically for on-board planning and re-planning. Discrete decisions, or courses of action (COAs), can be navigational in nature (e.g., whether to take an aggressive or cautious route) and can also include logistics decisions, such as where to refuel (of N refueling options).

The system according to embodiments of the present disclosure advances the state-of-the-art in interpretable machine learning in that it attempts to derive causal factors for decision-making as opposed to using correlational machine learning methods. Causality is learned in one of two ways. First, a causal manipulator intelligently augments the input data to elicit the minimum amount of feedback from a user using perturbed versions of the highlighted causal factors. This can be thought of as producing counterfactual words which help separate correlated confounder factors from the true causal factors. Second, causal scoring methods are used to estimate causal factors from observational data, without user feedback. These methods are explained in further detail below.

Furthermore, the present invention surpasses current planners by discovering causal factors for course of action (COA) selection, ranking recommendations, and visualizing them in the input data via an interpretable user display. Standard machine learning models that may predict an optimal course of action serve as Step 1 of a three-step process to determine these factors in the invention described herein. The system's goal is to determine which features of the high-dimensional observations cause a decision-maker to select their optimal COA. The difference between causal and correlational features derived by machine learning methods is that a causal model removes the effects of confounding variables in the estimation of the optimal COA and captures a generative relationship between the observed data and COA, (i.e., for any given input in the space of observations, the correct COA can be determined). The benefit of this is that the model is no longer limited by the statistics, bias, or sampling errors of the training dataset and, therefore, produces more robust and accurate predictions on previously unseen, future, and partial datasets.

In addition to the advantages over standard machine learning models described above (i.e., more robust learning and higher out-of-sample prediction accuracy), causal feature learning also goes beyond state-of-the-art explainable artificial intelligence ("XAI") methods. The difference between the system according to embodiments of the present disclosure and an XAI system is subtle but very important. While XAI models, such as SHAP features or Layerwise Relevance Propagation, attempt to explain the causal reasoning of a (potentially flawed or biased) machine learning model, causal feature learning aims to explain the causal reasoning inherent in the real-world data generation process. This requires causal feature learning to have a feedback loop outside of the XAI machine learning process which allows for interventions into the real-world (e.g., in the form of user feedback via the causal manipulator described below), or a meta-learning of important features from distributions of input data (e.g., the causal scoring mechanisms described below). This means that instead of learning the reasoning process of the machine learning model, the present invention directly learns the reasoning process of the decision-maker.

(3.1) System Pipeline

Figure 3:
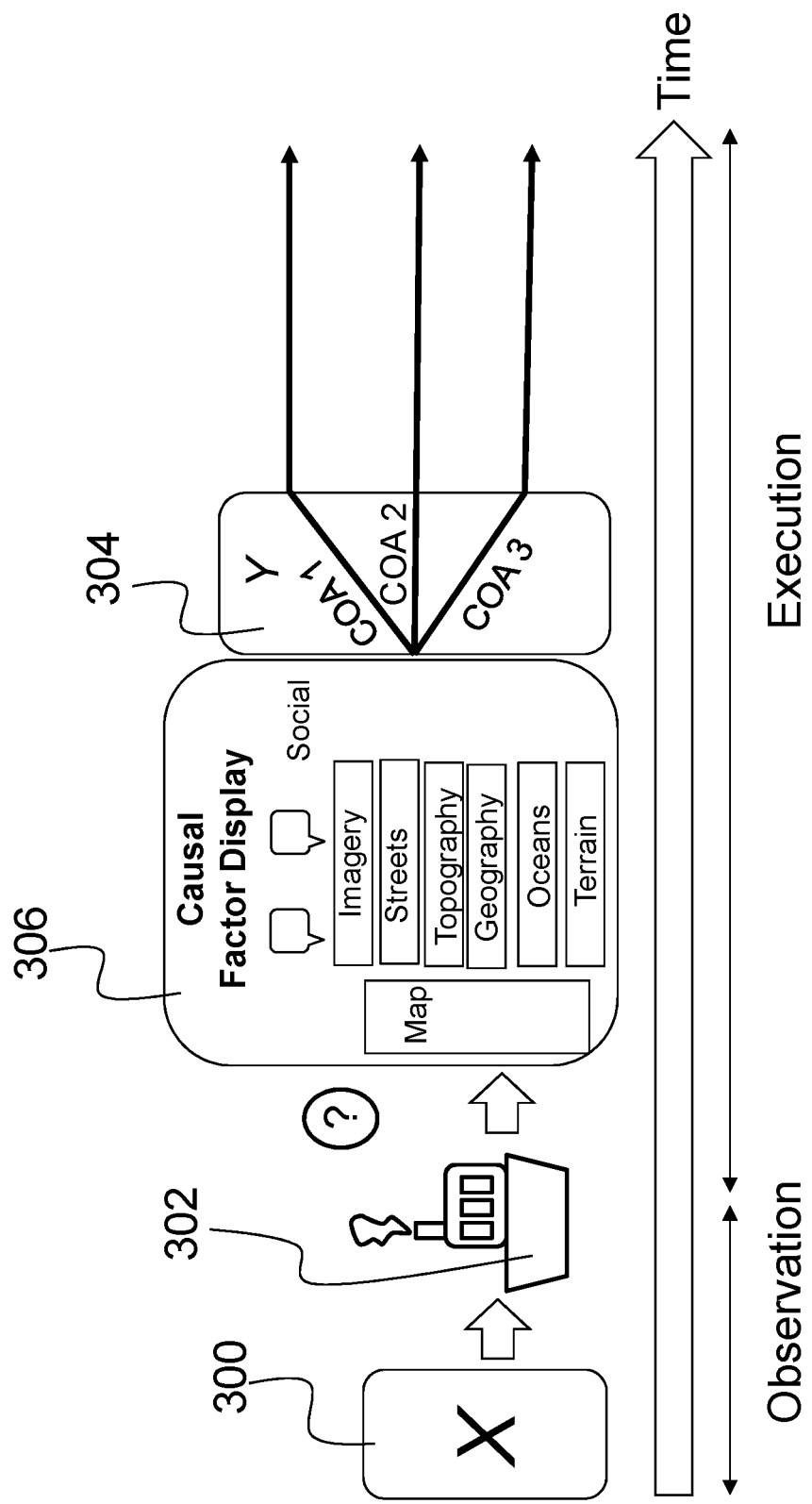
FIG. 3 is an illustration of the concept of operation of a decision recommendation system according to some embodiments of the present disclosure.

FIG. 3 shows the concept of operations for the system described herein. During training, the system determines which features of high-dimensional historical observations (element 300) X cause a decision-maker (element 302) (e.g., commander on a ship) to select their optimal course of action (COA) from a decision space Y (element 304). Note that the cardinality of the decision space Y (element 304) need not be known a priori for the historical observations (element 300); the learning process (specifically the unsupervised clustering in Step 1) will determine this automatically.

The system trains off-line using the high-dimensional historical observations (element 300) and COA pairs (i.e., (X,Y)) in the decision space Y (element 304). Historical observations refer to the observed input data X, which along with the decisions Y, are used for offline training of the system. Non-limiting examples of historical observations include satellite imagery, and numeric features, such as "heading", "distance", or "intercept angle" data. While deployed, the historical observations (element 300) are updated with incoming sensor data. Causal features (also referred to as causal factors) in the causal factor display (element 306), where causal features/factors are graphically displayed, and optimal COAs in the decision space Y (element 304) are also updated according to the trained model. The training and deployed (testing) pipelines are depicted in FIGS. 4 and 5, respectively.

Figure 4:
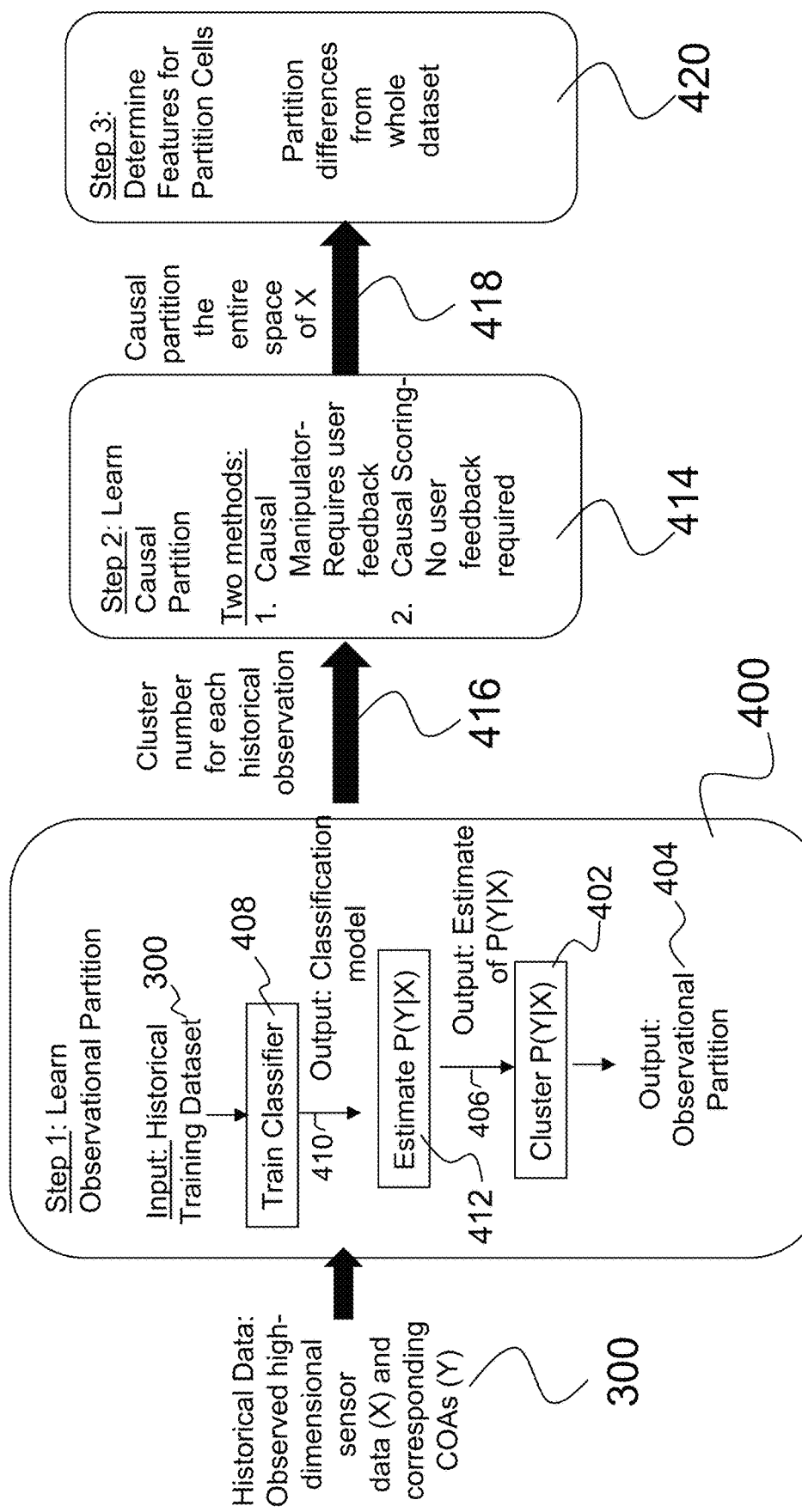
FIG. 4 is an illustration of offline training estimating causal features using historical data according to some embodiments of the present disclosure.
Figure 5:
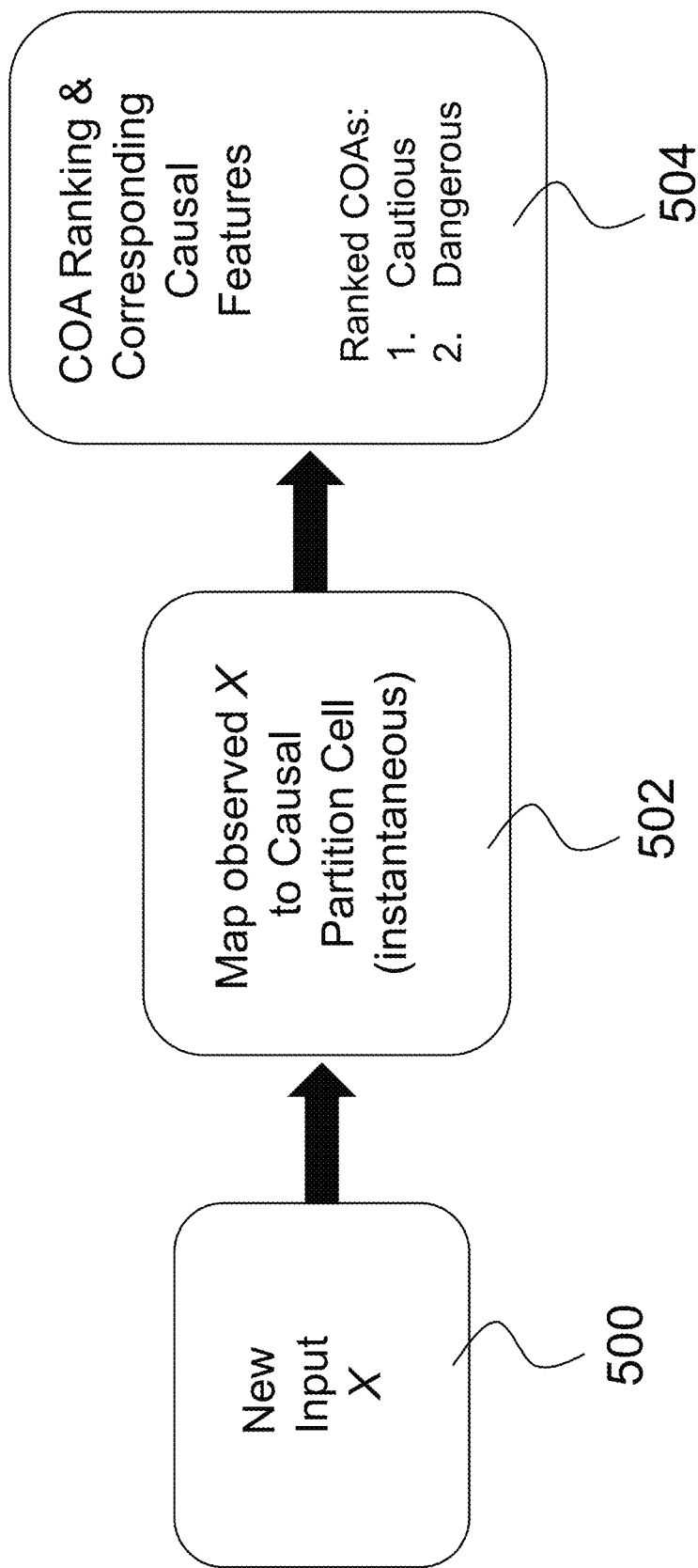
FIG. 5 is an illustration of system deployment, where the system produces accurate predictions of optimal course of actions (COAs) and visual reasoning via a causal feature display according to some embodiments of the present disclosure.

FIG. 4 illustrates an offline training pipeline estimating causal features using historical data comprising a three step process. Causal features are computed in Step 3, but are not necessarily displayed in the offline training process. The causal features/factors are displayed during operation (also known as testing) in FIG. 5. The input to Step 1 (element 400) of the process is historical training data, which includes high-dimensional historical observations (element 300) X and corresponding COAs from the decision space Y. The output of Step 1 (element 400) is an observational cluster (element 402), which generates an observational partition (element 404) of the space of X. An observational partition (element 404) is a partition of input observations $X_i$ which results from clustering an estimate of P(Y|X) (element 406) obtained from the input training dataset (element 300). Each partition cell corresponds to the linear decision boundaries for one observational cluster (element 404). A classifier is trained (element 408) using the historical training dataset (element 300), and a classification model (element 410) is output. Next, the system estimates P(Y|X) (element 412), and outputs the estimate (element 406). The estimates (element 406) are clustered based on their observed correlation with Y (i.e., cluster an estimate of P(Y|X)). This clustering serves as an initial observational partition (element 404) of the space of X.

A primary innovation of the present invention lies in Step 2 (element 414). A cluster number (element 416) for each historical observation is passed to Step 2 (element 414), as depicted in FIG. 4. A cluster number refers to 1 of N discrete decisions. For example, if the possible navigational decisions are "cautious" or "dangerous", then there are two clusters of data, and they are numbered cluster 1 and cluster 2. It is the number of clusters of data points that each observation may fall into. If the number of possible decisions are known a priori, then the number of clusters corresponds to the number of causal partition cells. If not, it is possible that the number of causal partition cells may be less than the number of clusters, and this should be discovered in the training of the system.

The purpose of Step 2 (element 414) is to learn the causal partition, C. The causal partition (element 418) of the input space assigns observations $X_i$ to a particular cell based on all observations in that cell having the same causal impact on the optimal COA Y. Knowing how to assign a new $X_i$ to a causal partition cell is equivalent to obtaining a correct prediction of Y.

There are two methods of using the observational partition (element 404) to determine the causal partition (element 418). These methods use decision boundary and distributional information to determine the causal partition (element 418), which is proven in Literature Reference No. 3 to result from a further grouping or "coarsening" of the observational partition. As described in Literature Reference No. 3, the causal partition (element 418) can be obtained from further grouping cells of the observational partition (element 404). This is equivalent to merging observational clusters. Causal coarsening is achieved in one of two ways referred to as causal manipulator, which requires user feedback, and causal scoring, which does not require user feedback. The causal manipulator functions to identify $X_i$s (i.e., observations) close to observational partition boundaries in order to create synthetic observations which, when fed to an oracle (an expert decision-maker, or simulator), allows for updating and refining the observational partition (element 404) to the ground truth causal partition (element 418). Several recent methods for attempting to obtain causal relationships from observational data without the ability to manipulate (intervene on) the system are described in Literature Reference No. 5. These methods are adapted to score potential causal coarsenings (i.e., causal scoring) and arrive at an estimated causal partition (element 418). The system described herein proposes synthetic data examples to the decision-maker (element 302) to test whether the correlative features derived by the initial classifier (element 408) are causal, or confounding. The potential causal features are the set of all correlated features (i.e., XAI feature per Xi (element 801) which come from the initial classifier (element 408), depicted in FIGS. 8 and 9.

Figure 6:
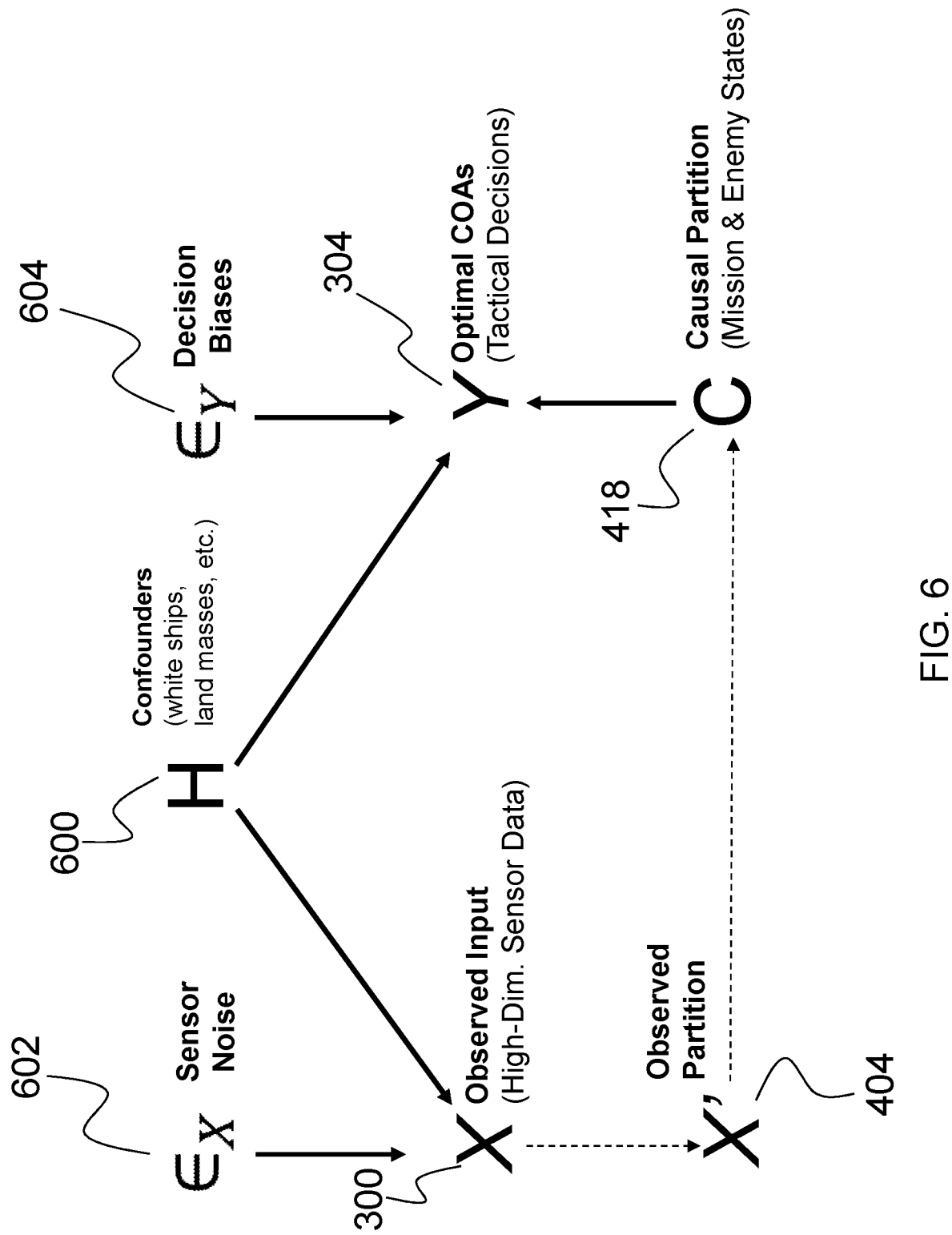
FIG. 6 is an illustration of a causal and "constitutive" (grouping) diagram for causal feature learning according to some embodiments of the present disclosure.

The purpose of Step 3 (element 420) is to determine and display causal features (or factors). Causal features are discriminative aspects of the cells of the causal partition, or observational factors. These are the visual reasoning for the assignment to a particular cell of the causal partition. Observational factors (also referred to as observational features) are discriminative aspects of the cells of the observational partition (or clusters of X). Some of these factors/features may correlate with the optimal COA but are not causal of it. Causal feature learning aims to determine which features are only correlative and remove them from the prediction model. The causal features which more robustly predict Y are derived by quantitative estimation of the uniqueness of each of the causal partition cells. In other words, what is it about each of the causal partition cells that makes it map to a different Y value? The method used to derive causal features is partially adapted from Literature Reference No. 3, and follows the arrows in FIG. 6, from X to Y, which illustrates causal and "constitutive" (grouping) diagram for causal feature learning, which will be described in detail below. FIG. 6 depicts a causal and "constitutive" (grouping) diagram for causal feature learning, where solid arrows represent causal relations and dashed arrows represent constitutive relations. The causal model according to embodiments of the present disclosure removes the effects of confounding variables produced by confounders (element 600), such as white ships (defined in the simulation section below) and land masses. Confounding variables include sensor noise (element 602) and decision biases (element 604). For instance, noise from radar or electro-optical sensors can be caused by bad weather, signal fading due to distance, transmission power issues, or asymmetric sensing abilities between ships. Decision biases can be caused by past experiences of a commander or other cognitive biases. The causal model also captures the relationship between the observed input data (element 300) (i.e., high-dimensional sensor data) and the optimal COAs (element 304) (e.g., tactical decisions) via determining the observed partition (element 404) and the causal partition (element 418).

FIG. 5 illustrates the deployment pipeline, wherein the system produces accurate predictions of optimal COAs and visual reasoning via the causal factor display (element 306), which displays COA ranking and corresponding causal features (element 504). Given a new input (element 500), the system maps the new input to a causal partition cell (element 502) obtained during training (see FIG. 4). As described above, knowing how to assign a new input (element 500) to a causal partition cell is equivalent to obtaining a correct prediction of Y. Y's can be ranked, and the causal features for each of the Y's can be displayed to the user via the causal factor display (element 306). Each of the components of the training and deployment pipelines are described in detail below following a description of the simulated scenario.

(3.2) Simulated Scenario

In order to test the system described herein, a data simulator was created which generates naval operational scenarios, historical observational and optimal decision (X, Y) pairs, and "user" feedback for a causal manipulator, which will be described in detail below. In practice, the simulator would be replaced by real historical decision-making data and expert decision-maker feedback (assuming the manipulator module is used). The particular scenario described herein is a "red rover" scenario wherein a blue ship is facing a decision that determines how it will navigate from its initial position to its destination while minimizing the chances of a confrontation with any red ships that are positioned between the blue ship and its destination. This is a deliberately simple scenario with only a small number of ships, and no sensor noise or dynamic weather. This is so that one can more easily interpret the results and debug the system.

In this scenario, the red ship (labeled "s0" in X) is initially stationary at a designated position that it is tasked with defending. If the blue ship moves within a predefined radius of the red ship-passing through red's defense perimeter-then the red ship will attempt to intercept the blue ship until the blue ship moves back outside of the perimeter. If the blue ship is successfully intercepted by the red ship, then the blue ship sustains "damage" (negative utility) that is proportional to the duration of the intercept. If the blue ship eventually makes it to its destination, then it receives a utility that is proportional to the time it took to reach the destination less any negative utility incurred from being intercepted. The blue ship has two navigation behaviors to choose from: a cautious behavior that maintains a distance greater than the radius of the red ship's defense perimeter (taking evasive maneuvers when necessary), and a dangerous behavior that essentially ignores the dangers posed by the red ship and navigates directly to the destination without taking any evasive maneuvers. The decision of which behavior to take is determined by evaluating the utility of each behavior via simulation and then choosing the one that yields the greater utility value; ties are broken in favor of the dangerous (more direct) behavior.

A third white ship (labeled "s1" in X) exists in this scenario as well, and both the red ship and the blue ship treat it as a neutral entity. The navigation of the white ship is governed by a random walk where, at each time step, an angle is randomly drawn and the ship turns toward this angle while maintaining a constant rate of speed, though relatively slow in comparison to the red and blue ships. The purpose of the white ship is to offer a confounder (H) for the causal discovery process since its positions are observable, and in some cases correlate with the movements of the red ship, but are irrelevant for the blue ship's navigation decisions. Note that more realistic navigational behaviors will be utilized in the future for confounders.

Figure 10A:
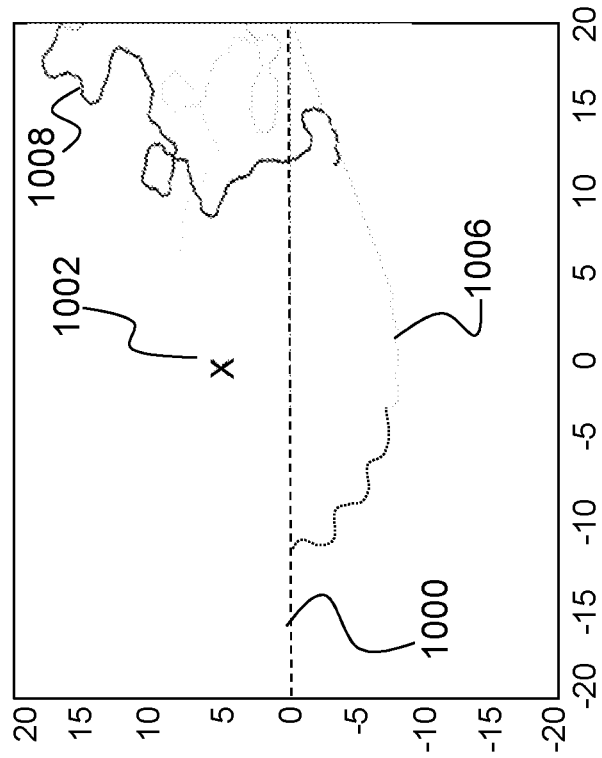
FIG. 10A is an illustration of a "dangerous" behavior simulation run of a single blue ship starting at (−20, 0) and tasked with reaching the position (20, 0) according to some embodiments of the present disclosure.
Figure 10B:
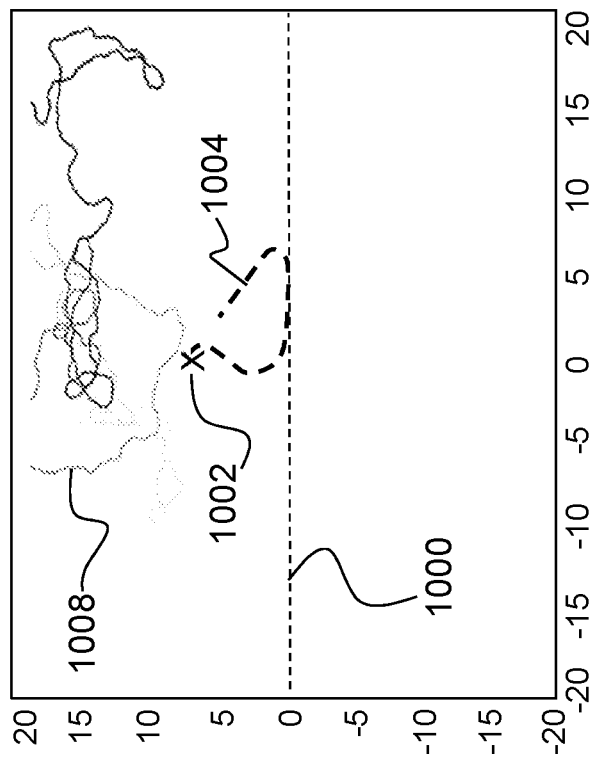
FIG. 10B is an illustration of a "cautious" behavior simulation run of a single blue ship starting at (−20, 0) and tasked with reaching the position (20, 0) according to some embodiments of the present disclosure.

More concretely, and as shown in FIGS. 10A and 10B, the blue ship is initialized at position (−20, 0) and is tasked with reaching the destination at position (20, 0), as indicated by the dashed horizontal line (element 1000). The red ship (element 1002) (denoted by the "X") is randomly initialized to a point somewhere on the vertical line segment between (0,−16) and (0, 16), and is tasked with defending an area around this point of radius D=10. The cautious behavior dictates that the blue ship make evasive maneuvers to increase the distance from the red ship if the blue ship ever gets within a distance of 13 units from the red ship. The dangerous behavior simply takes the blue ship directly to its destination no matter how close it gets to the red ship which, obviously, will cause the red ship to attempt an interception of the blue ship if the red ship happens to be initialized within a distance D of the blue ship's course.

In FIG. 10A, the blue ship executes the "dangerous" behavior and follows the direct course (represented by the dashed horizontal line (element 1000)). An action prompts the red ship to attempt an intercept of the blue ship (as indicated by the bold dashed line (element 1004)) tracing the red ship's movement. In FIG. 10B, the blue ship executes the "cautious" behavior and maintains a significant distance from the red ship as shown by the path the blue ship takes (the curve that drops below the horizontal line (element 1006)). In both FIGS. 10A and 10B, the white ship begins at a position near the red ship's initial position (element 1002) but moves erratically away from there. The white ship's path (element 1008) can be read by noting that the bolder segments of the squiggle correspond to later time steps, and lighter segments correspond to earlier time steps. This scenario is designed so that the blue ship prefers to exercise the cautious behavior when the red ship is positioned close to the blue ship's course (element 1000) and to employ the dangerous behavior when the red ship's position does not present a significant threat. However, as FIG. 10A shows, it is sometimes optimal for the blue ship to use the dangerous behavior even though the red ship is within distance D of the blue ship's direct course. This happens when the benefit to the blue ship of the reduction in time-to-destination (over the cautious behavior) outweighs any costs stemming from a limited amount of potential exposure to the red ship's pursuit. Hence, there may be instances of the blue ship opting for a "dangerous" behavior if it leads to significant time savings over the "cautious" behavior. The simulated dataset for this scenario consisted of 10,000 {X, Y} pairs, 3003 of which came from class "cautious" and 6997 of which came from class "dangerous." Each X observation is a 100-dimensional feature vector containing variables like ship type, and ego-centric (relative to the blue ship) measures of distance and heading angle.

(3.3) Step 1: Learn Observational Partition (element 400)

Figure 7:
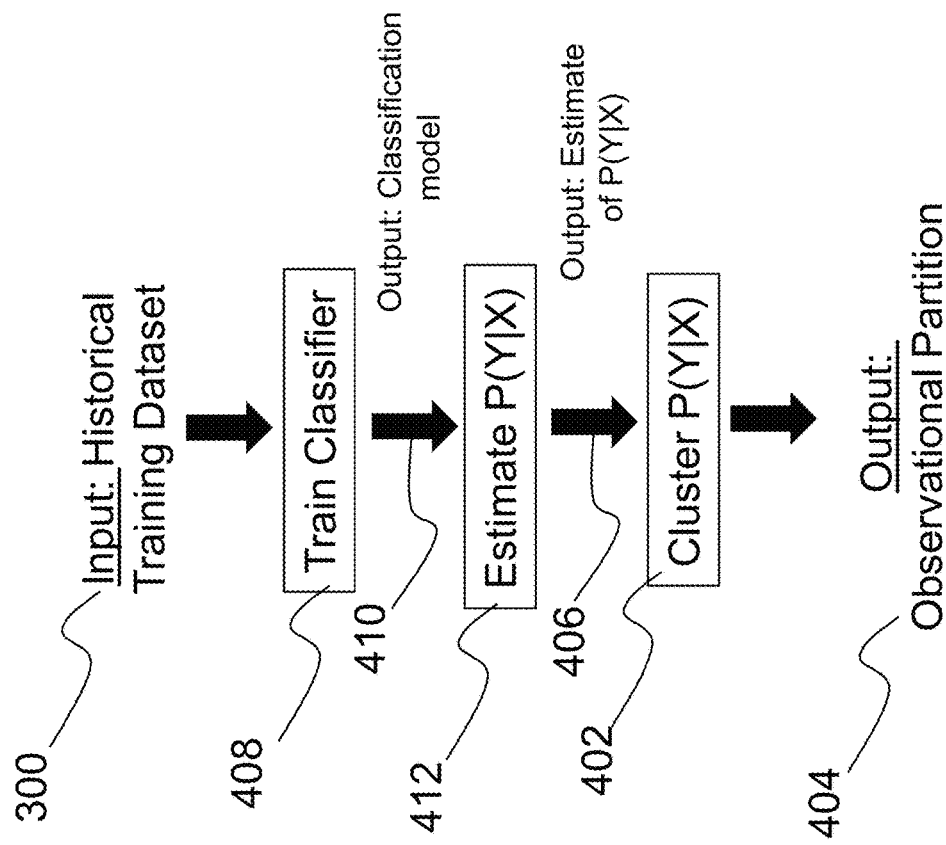
FIG. 7 is a flow diagram illustrating derivation of the observational partition according to some embodiments of the present disclosure.

The input to Step 1 (element 400) is historical (X, Y) training data (element 300), and the output is observational clusters (element 402), resulting in the observational partition (element 404). The pipeline for obtaining the observational partition (element 404) X' is depicted in FIG. 7 and is inspired by the observational partitioning process in Literature Reference No. 2. The goal of deriving the observational partition (element 404) (i.e., the linear decision boundaries derived from the clustering of observed data) is to cluster the observations X according to the conditional density of P(Y|X). In the invention described herein, P(Y|X) (i.e., probability of Y given X) is approximated (element 412) with its expected value E[P(Y|X)]. This means that it is assumed that if two distributions have equal means, they are considered equal. Learning E[P(Y|X)] amounts to regressing Y on X. This can be done with any state-of-the-art classifier which can capture non-linear dependencies between X and Y (e.g., XGBoost (see Literature Reference No. 2), neural network (see Literature Reference No. 2)). The $X_i$'s are then clustered based on the classifier's learned understanding of P(Y) $X_i$). In the case of Literature Reference No. 2, this amounts to clustering the values of the last (soft-max) layer of the neural network for each $X_i$ that is fed through the network.

The invention according to embodiments of the present disclosure differs from Literature Reference No. 2 in that it is recognized that the estimation of P(Y $X_i$) (element 406) maps to the explainable artificial intelligence (XAI) problem. In other words, one would like to identify the features in the input domain which correlate with the output prediction, and cluster similar features together. Therefore, one can use any XAI method (e.g., SHAP(see Literature Reference No. 7)) to derive the (classification) importance values for features in the input space, and cluster those importance values to obtain the observational partition (element 404) of X. Any clustering method can be used for this step, which adequately captures variation in the data. For instance, in the present invention, K-means (see Literature Reference No. 6), DBSCAN (see Literature Reference No. 8), and Hierarchical Clustering (see Literature Reference No. 10) were implemented. The results described herein use K-means clustering with K=|Y|, since the simple naval scenario only has two COA classes. This clustering serves as the starting point for causal feature learning.

(3.4) Step 2: Learn Causal Partition (element 414)

Figure 8:
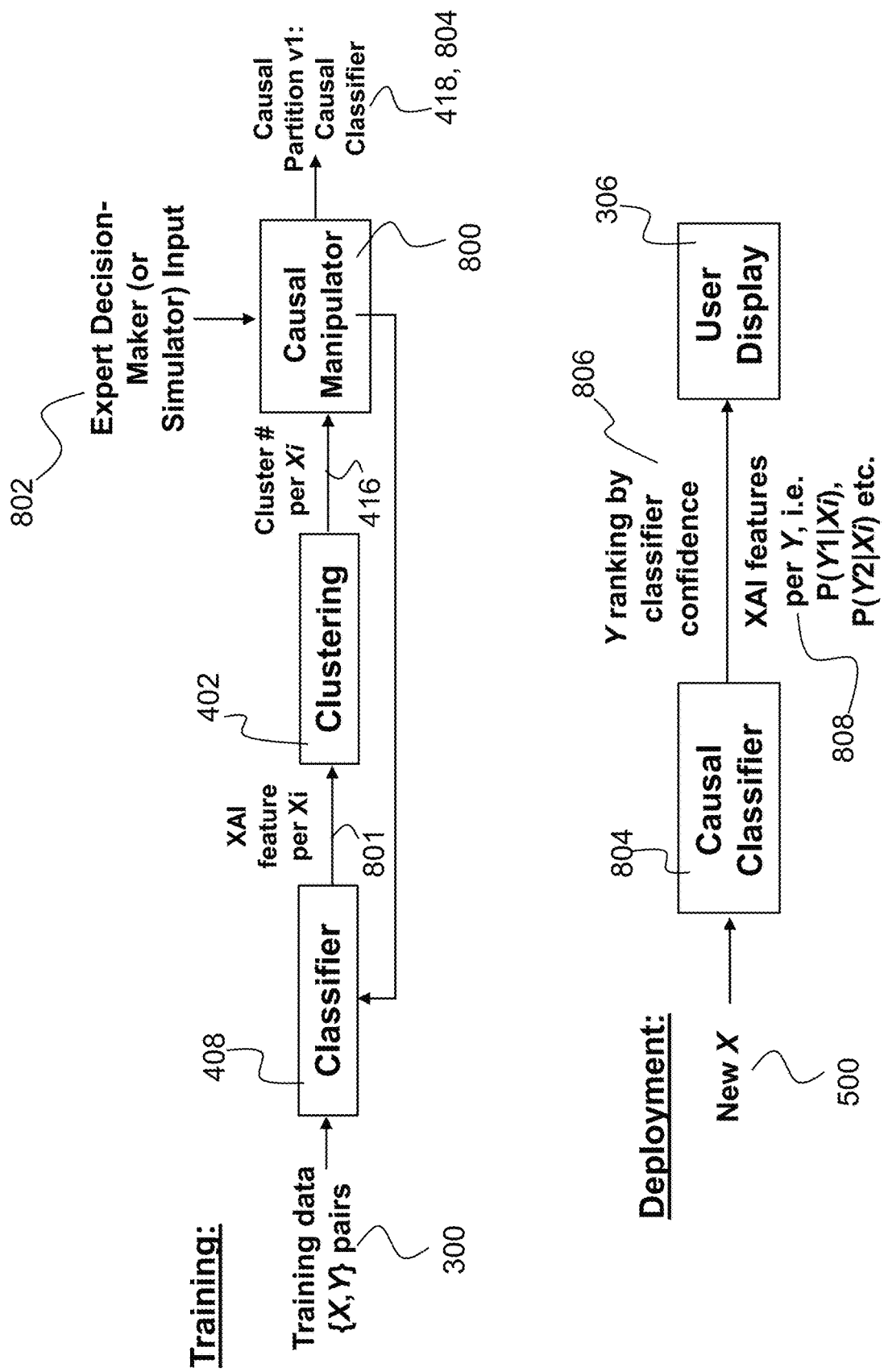
FIG. 8 illustrates the training and deployment pipelines for the causal manipulator method utilizing user feedback according to some embodiments of the present disclosure.

(3.4.1) Causal Manipulator (FIG. 8, element 800)

Referring to FIG. 4, the input to Step 2 (element 414) is observational clusters (element 402), which generate an observational partition (element 404) of the space of X, and the output is causal partition (element 418) of the space of X. FIG. 8 illustrates the training and deployment pipelines for the causal manipulator method, which is included in Step 2 (element 414).

The general purpose of the causal manipulator (element 800) module is to help resolve class boundaries in the decision space by applying subtle variations to an existing instance $X_i$ to get a new instance $X_j$ that is close to $X_i$ (for an appropriate distance metric) but is potentially mapped to a different class than $X_i$ (e.g., CLS(X)≠CLS($X_j$)), where CLS denotes the trained classifier (element 408). XAI features (element 801) are computed from the trained classifier (element 408) using the SHAP or LRP methods (see Literature Reference Nos. 12 and 13, respectively). The SHAP and LRP method assign a numeric feature importance value to each dimension of each input observation $X_i$. The feature importance values are then clustered (element 402).

This process refines the decision boundaries (i.e., partition) for the space of X to derive the causal partition (element 418). Decision boundary information (i.e. low-confidence classifications) can be targeted for this process in order to pinpoint the minimum feedback necessary to determine the causal partition (element 418). In a simulated scenario, the causal manipulator (element 800) is expected to generate synthetic observations in which the locations of the white and red ships in the simulation are not correlated, thereby clarifying that the white ships are confounders which have no effect on Y, whereas the red ships are causal factors, upon which the COA Y is based.

The manipulation process is described in detail in Algorithm 2 of Literature Reference No. 1 and involves merging "close" instances $X_i$ and $X_k$ that come from classes CLS $(X_i)=Y_i$ and C($X_k$)=$Y_k$, $Y_i \neq Y_k$ into an instance $X_j$ that is then synthesized and fed to an "oracle" to come up with the ground truth optimal COA $Y_j$. In practice, the oracle is an expert decision-maker (element 802) who will be shown the new synthesized data X; and asked to select their optimal COA $Y_j$. In experimental studies, the simulator was utilized for this. The new instance contains ships whose initial locations are "blended" (i.e., averaged) from the initial locations of their counterparts in $X_i$ and $X_k$. This is accomplished by first matching the ships in $X_i$ and $X_k$ and then, for each pair, creating a new ship in X with an initial state (e.g., position and, in the case of red ships, patrol area) that is a weighted average of the initial states of the pair. Note that this blending can happen directly on the historical data in practice; it does not require the usage of the data simulator. This new instance $X_j$ along with its ground truth $Y_j$ are then added to the training data (element 300) used to refine the classifier (element 408), CLS. The additional training instances ($X_j$, $Y_j$) allow the causal discovery procedure to better identify the causal features by systematically probing ("intervening") to outline the boundaries in the space of causal classes and, therefore, causal factors. The final classifier, referred to as the causal classifier (element 804), is then treated as a representation of the causal partition (element 418) of X. That is, during deployment, for any new X (element 500), the refined causal classifier (element 804) will produce the correct Y through ranking by classifier confidence (element 806), and the system will transmit the ranking (element 806) and the XAI features (element 808) to the user display (element 306) for visualization.

Figure 9:
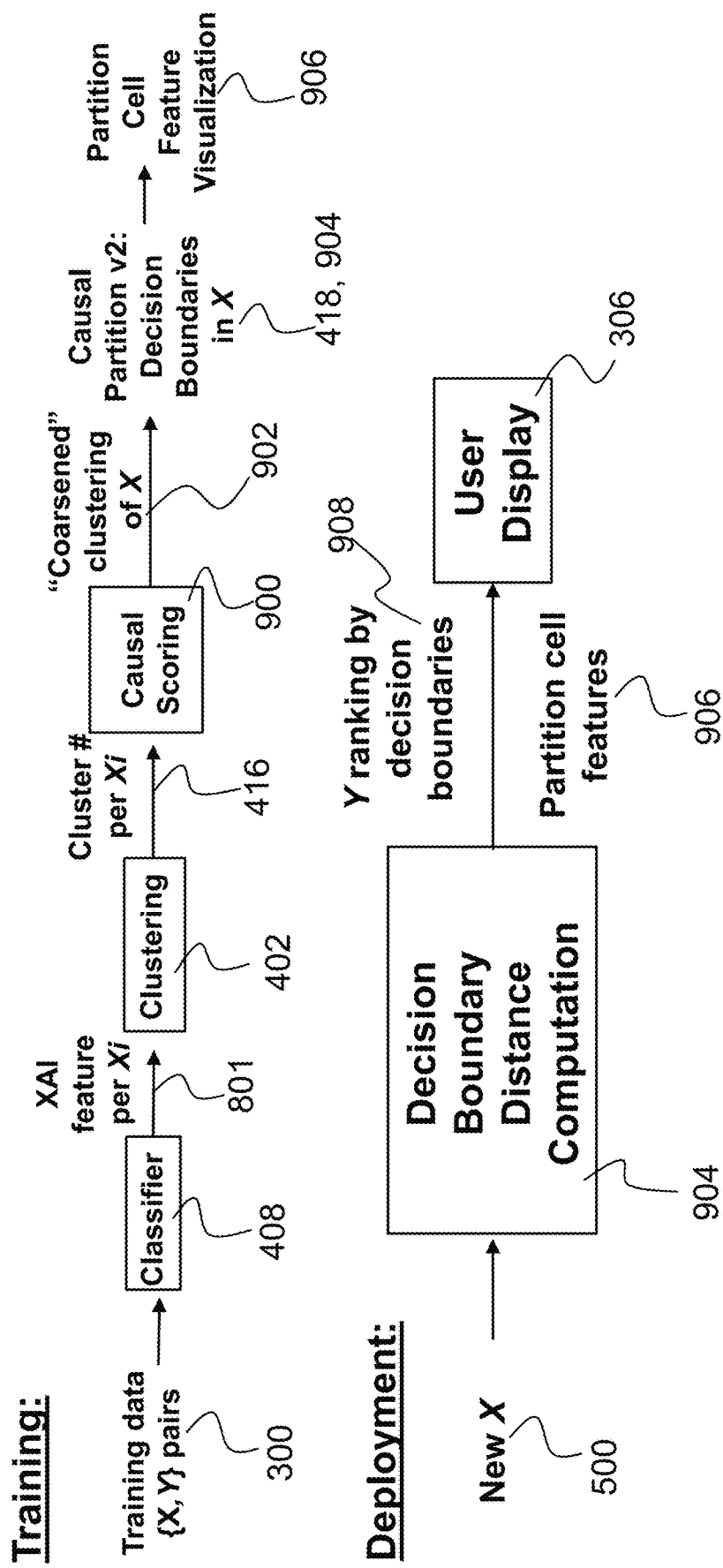
FIG. 9 illustrates the training and deployment pipelines for the causal scoring method with no user feedback required according to some embodiments of the present disclosure.

(3.4.2) Causal Scoring (FIG. 9, element 900)

The "Causal Coarsening Theorem" (see Literature Reference No. 3) dictates that the true causal partition results from the observational partition cells being further grouped, and this can normally only be done via intervention on the cause-effect system. It is assumed there is the ability to refine causal features by asking a decision-maker for their feedback on newly synthesized scenarios in order to construct the causal partition. In many cases, experimental intervention on X (e.g., access to decision-maker feedback) is not possible, therefore, one must attempt to derive causality from purely observed data. For this, existing work on the computation of a "causation coefficient" (see Literature Reference No. 5) was leveraged to build a unique scoring method for various groupings of the observational clusters in order to determine their plausibility as a causal partition.

The unique aspect in this process is the application of these scoring methods on complex command decision-making data and incorporation into the system, thereby extending the theoretical work of Literature Reference No. 5 to the applied domain. The specific scoring mechanisms selected (e.g., Literature Reference No. 11) are applicable on low-dimensional discrete data (i.e., the observational clusters (element 402)). The system described herein runs exhaustively through all possible merges ("coarsenings") of observational clusters and scores each of those using Literature Reference No. 11. After this scoring (element 900), the clustering with the highest causal score is obtained (i.e., "coarsened" clustering of X (element 902)), and the causal partition (element 418) is represented as the linear decision boundaries between those clusters (i.e., decision boundaries in X (element 904)). The output of the causal scoring method during training is partition cell feature visualization (element 906). During deployment, for any new X (element 500), the decision boundary distance computation (element 904) determined during training will produce the correct Y through ranking by decision boundaries (element 908), and the system will transmit the ranking (element 908) and the partition cell features (element 906) to the user display (element 306) for visualization.

The system described herein uses either causal scoring (element 900; FIG. 9) or causal manipulation (element 800; FIG. 8). If feedback in the form of human intervention is available, then the causal manipulator is used. If not, then causal scoring is utilized. Human intervention to adjust the system will generally be a more accurate route to discover causal features, if available.

(3.5) Step 3: Feature Visualization (Element 420)

The input to Step 3 (element 420) is the causal partition (element 418) of the space of X (element 420), and the output is a visualization of causal features which characterize each partition cell (elements 808 and 906). The system according to embodiments of the present disclosure provides a visualization of causal features belonging to the final causal partition (element 418) in two ways. In the first, the centered means of each cluster in the original feature space is shown, and in the second, the cluster means in the image space of generated images is shown. All visualizations described below show the observational partition features derived using the K-means clustering method, but the same visualization methods are used for the causal partition features.

To visualize the observational factors, the deviation of the observations which fall into each observational partition cell center from the overall dataset mean is shown. For example, in FIG. 11, it is shown that the variable measuring distance to the blue ship's course from ships s0 (red) and s1 (white) for the first observational cluster (cluster 0, represented by the solid line (element 1100)) are lower than average by about 1.75 (see DIST_TO_COURSE s0 and DIST_TO_COURSE_s1), and more importantly, differ from the second observational cluster (cluster 1, represented by the dashed line (element 1102)) by approximately 3 units. The features of the red and white ships are intentionally correlated in this observational partition, such that the causal partition should learn that white ships are not a causal factor for navigational decisions.

Figure 12A:
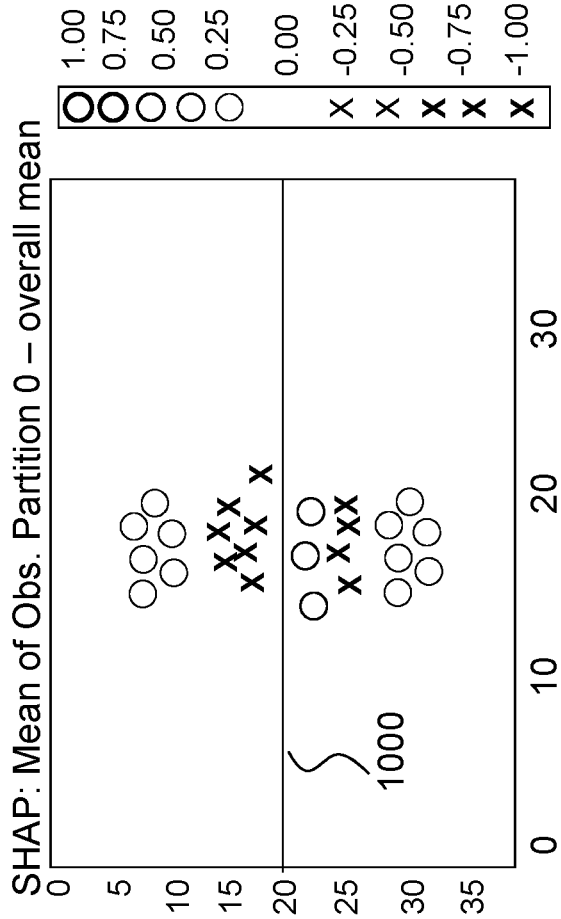
FIG. 12A illustrates probabilities of the location of the white and red ships with respect to the blue ship for observational partition '0' according to some embodiments of the present disclosure.
Figure 12B:
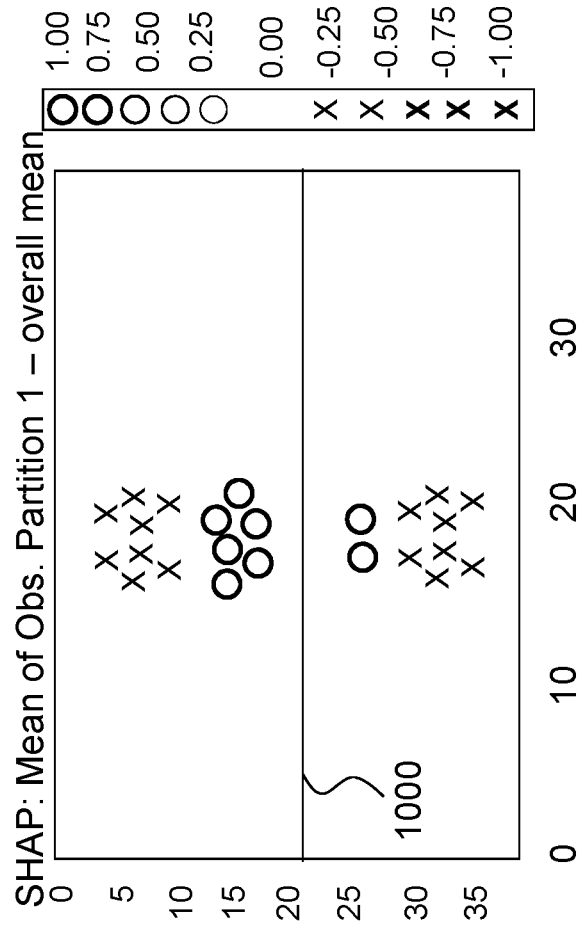
FIG. 12B illustrates probabilities of the location of the other ships with respect to the blue ship for observational partition '1' according to some embodiments of the present disclosure.

Additionally, the features in the "image" space where the images are assumed to be part of the historical data X (e.g., generated by the simulator) are visualized. The images contain the location of the red, white, and blue ship ("self"). FIGS. 12A and 12B show subtraction of the total dataset mean image from the mean image for a particular decision (partition cell). Red (represented by circles) means that this decision (partition cell) has more ships in this region than average, and white (represented by Xs) means that it has less ships in this region than average. The horizontal line in the center (element 1000) indicates the blue (ego) ship's planned path. Therefore, in Partition 0 (FIG. 12A), more ships are farther from the ego ship's path, and in Partition 1 (FIG. 12B), more ships are close to the ego ship's path. In FIG. 12A, the probabilities of the location of the white ship and red ships with respect to the blue ship (represented by the line (element 1000)) for observational partition '0' are shown. For this partition, it is clear that the other ships stay pretty far away from the blue ship. In FIG. 12B, the probabilities of the location of the other ships with respect to the blue ship (element 1000) for observational partition '1' are shown. Here, more risky behavior is observed, with the other ships quite close to the blue ship.

In observational partition 0, the white ship's distance is higher than average away from the blue ship (FIG. 12A), the red ship's distance to the blue ship is higher on average as well (correlated with class output "cautious"). The trend is reversed for observation partition 1 (i.e., when the white ship is close to blue (FIG. 12B)), where it is shown that the red ship's distance to blue is lower than average as well (correlated with class output "dangerous"). In practice, these features would be displayed for each layer of the multi-dimensional input data (e.g., a weather layer, an enemy ship layer, an enemy submarine layer, commercial shipping routes). Each layer would have a similar visualization to FIGS. 12A and 12B.

Figure 11:
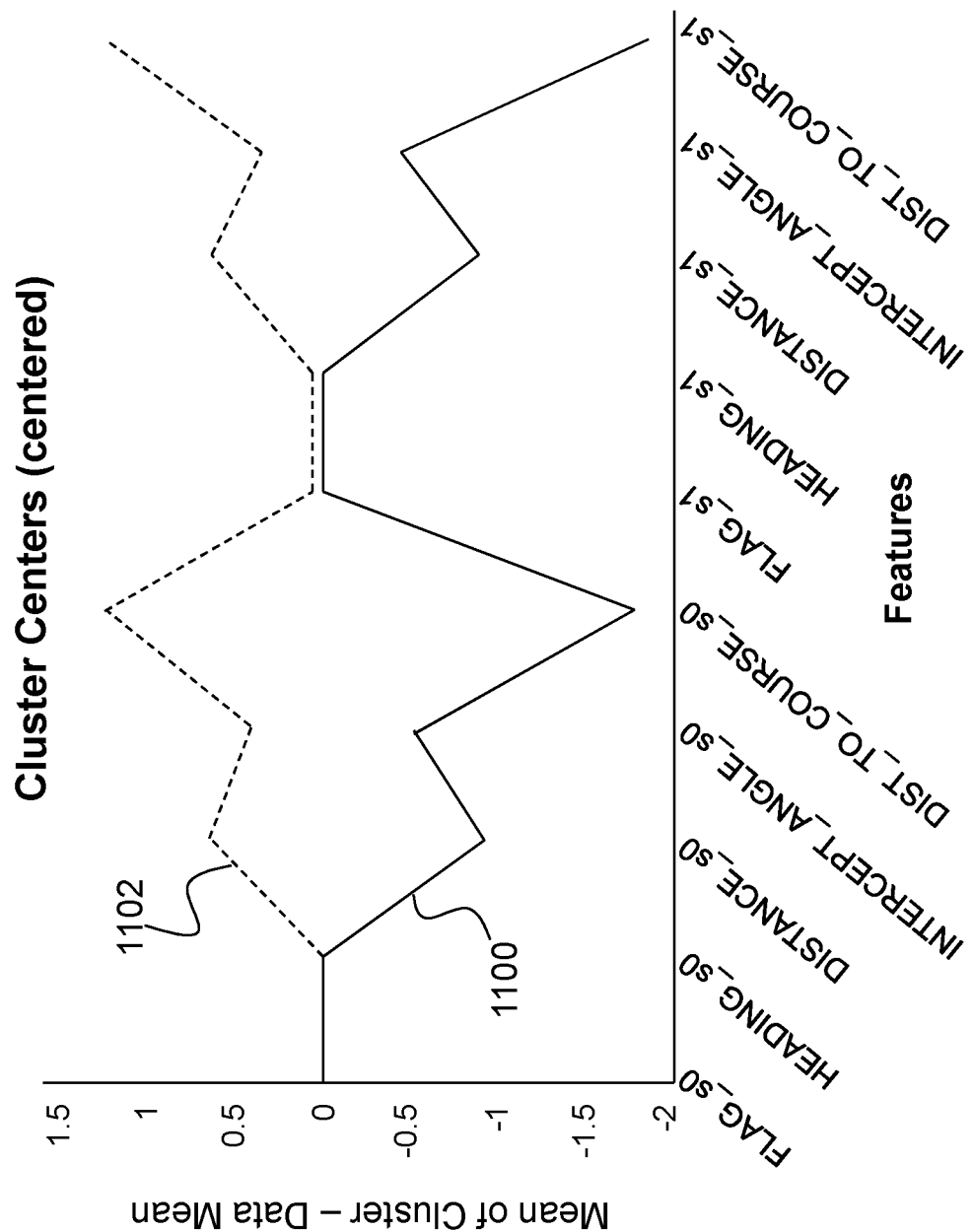
FIG. 11 is a plot illustrating cluster centers of the observational partitions according to some embodiments of the present disclosure.

In the visualization shown in FIG. 11, the dimensions of the input data which define each decision are displayed as the mean of the decision cluster subtracted by the dataset mean. This highlights decisional features (input dimensions) by showing large positive or negative values for those features that are significant. In the visualization shown in FIGS. 12A and 12B, the same process is used in the "image space". This mean that x-y locations of various agents (e.g., ships) are visualized as images in separate intelligence layers, and the mean images for each decision cluster are computed and subtracted by the dataset mean images.

Figure 13:
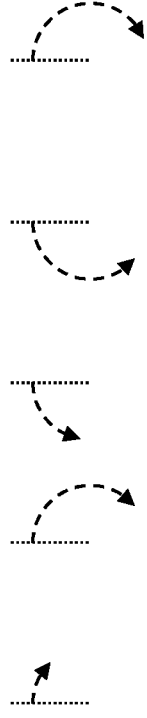
FIG. 13 illustrates different glyph types for different features to be used in the causal feature display according to some embodiments of the present disclosure.
Figure 13:
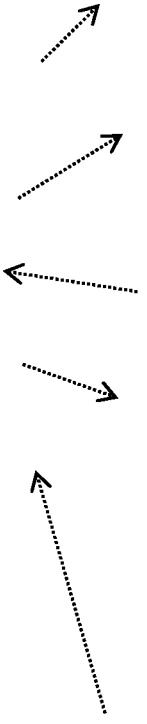
Figure 13:
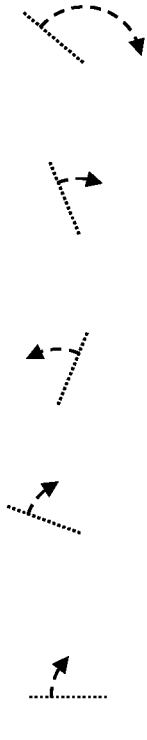
Figure 13:
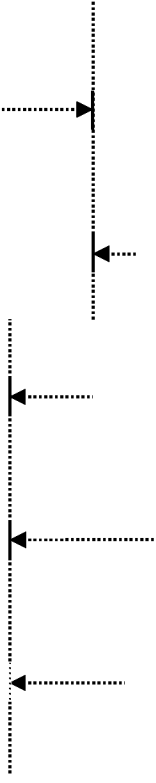
Figure 13:
Figure 14:
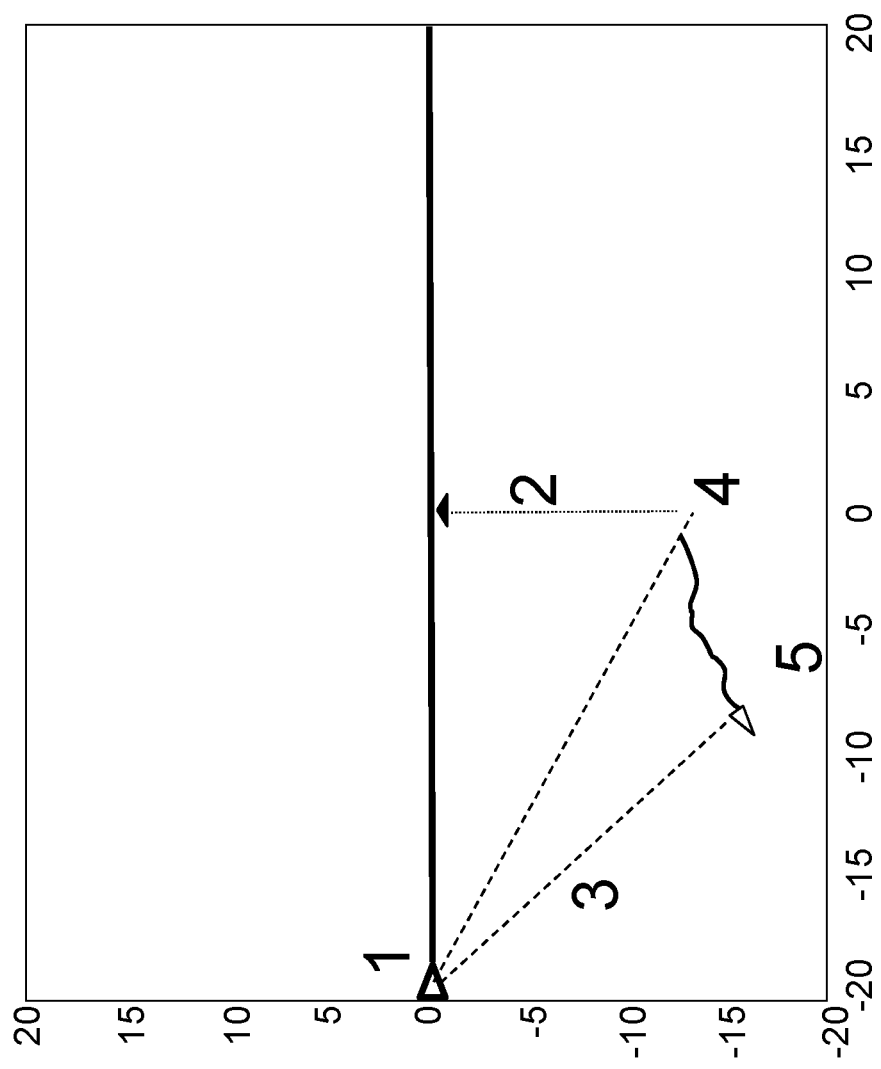
FIG. 14 illustrates a causal feature display for visualizing causal importance of features according to some embodiments of the present disclosure.

FIGS. 13 and 14 depict another type of visualization referred to as a glyph visualization, which includes glyphs (i.e., pictographs) of ships with features, such as "distance". Glyphs are used to identify each type of feature from the visualization illustrated in FIG. 11. FIG. 13 shows different glyphs for different features, including "headings", "distance", "intercept angle", "distance to course", and "flag". The lines of the glyphs can be varied by color, type (e.g., solid, dashed, bold), length, angle, and direction in order to visually convey information. For instance, different colors of glyphs are used to encode which COA the feature is significant to. For instance, the color red can be used to denote a feature's contribution to the "dangerous" COA, while the color green can be used for a "cautious" COA. Further, the SHAP importance of each feature can be encoded using the transparency of the glyph (e.g., varying degrees of weight for the lines of the glyph).

FIG. 14 depicts a causal feature display for visualizing causal importance of features, where 1 denotes the ego-ship, 2 denotes the distance to the course, 3 denotes the distance to the ego-ship, 4 denotes the flag of the ship, and 5 denotes the heading angle.

(3.6) User Display

Referring back to FIG. 8, in the case of the causal manipulator (element 800), the causal partition (element 418) is represented by the refined causal classifier (element 804) CLS. Therefore a new input X (element 500) is fed into that classifier (element 804) to produce the optimal Y, and Y's can be ranked by the causal classifier confidence (element 806). The causal classifier (element 804) is the result of the causal manipulation process via the causal manipulator (element 800) described in Section (3.4.1) above, and differs from the initially trained classifier (element 408) described in Section (3.1) in that its decision boundaries are updated with newly synthesized {X,Y} training pairs that are intelligently constructed to clarify the difference between confounding variables in X (e.g. white ships) and causal factors in X (e.g. red ships). The initial decision boundaries to be refined come from the trained classifier (element 408). Because the classifier decision boundaries map to the causal partition cells, the causal features (element 808) that are displayed to the user come directly from an XAI method, such as the SHAP features mentioned above. A new X is sent into the causal XGBoost classifier (element 804), and SHAP features, or causal features (element 808), for that observation are computed for each possible COA Y and displayed to the user via the user display (element 306) as highlighted regions in the space of X (see FIGS. 11, 12A, and 12B for examples), rank ordered by classifier confidence for each Y. As shown in FIG. 3, the causal factor display (element 306) can display features in the form of layers of multi-dimensional data, non-limiting examples of which include a social layer of messages between users (e.g., text messages, social platform messages), an imagery layer (e.g., images), streets layer (e.g., map/images at the street level), topography layer (e.g., map/images at the topography level), geography layer (e.g., map/images at the geography level), oceans layer (e.g., map/images at the ocean level), and terrain layer (e.g., map/images at the terrain level).

In the case of causal scoring (element 900) in FIG. 9, a new input X (element 500) can be directly mapped to a causal partition cell in the space of X, which has a one-to-one mapping to the optimal Y. The ranking (element 908) of sub-optimal Y's in the case of causal scoring (element 900) is determined by minimizing the distance between X and the other causal partition cell boundaries, each of which also has a one-to-one mapping to Y. The causal features displayed to the user for each of the ranked Y's correspond to the partition cell feature visualizations (element 906) described above, which is the partition cell mean centered by the total dataset mean (FIG. 5).

The invention described herein analyzes large amounts of high-dimensional data and decisions made from that data, and extracts highlighted regions within large amounts of high-dimensional data. The system surpasses current planners by discovering causal factors for COA selection, ranking recommendations, and visualizing them in the input data via an interpretable user display. The product of the invention is a recommendation action which is conveyed to the user via a display which shows the ranked list of decisions and highlighted regions in the input data. A non-limiting example of a ranked list of decisions is: 1) Proceed cautiously (cautious) followed by 2) Proceed aggressively (dangerous). For instance, the system according to embodiments of the present disclosure can be utilized in command decision-making scenarios. Specifically, a scenario where a long-term, strategic plan must be adjusted in the short-term (tactical), on-board a vehicle or during a mission, by a commander who has limited resources and time to make that decision. The system is a tactical decision aid that can be used to inform logistic/resupply naval planning. The expected value is to increase the optimality of decisions made by commanders by reducing cognitive load required to digest large amounts of sensor and intelligence data while simultaneously decreasing their time-to-decision. The present invention does this while being fully auditable (i.e., providing drill-down capabilities for system suggestions).

For example, using the simulation example described above and shown in FIGS. 10A and 10B, imagine the user (blue ship) is trying to choose a course of action (i.e., decision) based on observing a scenario containing adversaries (red ships) and neutral ships (white ships). Assume the locations of the white ships happen to coincide with the red ships due to use of common shipping ports. A standard machine learning model would learn that the locations of the white ships and the red ships are both predictive of (i.e., correlated with) the optimal course of action for the blue ship.

An XAI explanation of this scenario, according to prior art, would highlight both red and white ships in the input data. However, the system described herein adds a step (either through the causal manipulator (element 800) or causal scoring methods (element 900) based on specific shapes of statistical distributions of the input data) to differentiate between the causal impact of the red and white ships on the blue ship's decision. Specifically, the causal manipulator (element 800) is able to generate a synthetic input scenario in which the locations of the red ships and white ships are uncorrelated to differentiate that the red ships influence the blue ship's decision but the white ships do not (refer to section (3.4.1) above and Algorithm 2 of Literature Reference No. 1). Thus, this information would be useful in future scenarios where white ships are present, as the user would know that taking aggressive or defensive maneuvers is unnecessary.

In aiding a ship commander's decision making, the present invention has learned the causal factors for naval decisions in an offline training phase (see FIG. 4), such that during operation while out at sea, a commander need only input the known intelligence data for the current scenario (X) in order to obtain a ranking of possible courses of action and a visual display highlighting the causal factors for each of those decisions, namely as highlighted regions in each input intelligence layer. In other words, the present invention provides the specific facts in the input data set that directly result in the recommendation, which is an improvement over existing decision support machines. Providing the ship commander with the specific causes for the recommendation allows the commander to exercise his/her judgement in selecting the course of action.

In addition to assisting in decision making, the system described herein can cause a mobile platform to physically maneuver to perform a highest rank course of action. For example, given a set of weather patterns received from multiple intelligence sources, a mobile platform, such as an unmanned aerial vehicle (UAV), a ship (e.g., autonomous vessel), or other vehicle type, can navigate away from poor weather conditions based on the highest rank course of action. Similarly, if satellite images indicate the presence of a threat, such as an adversary, the highest rank course of action can be a route that avoids any physical maneuvers in the vicinity or trajectory of the threat.ac Furthermore, the system described herein is used for short-term (tactical) replanning given changing environmental conditions and contexts, and does not attempt to replace long-term strategic planning by higher level commanders which normally takes place on land, before ships are sent out on a mission. By using this system onboard, ship commanders can more easily sift through large amounts of data (e.g., 66+ layers of intelligence information) and make their final decisions based on a concise summary of relevant factors produced by the invention.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for generating and displaying decision recommendations, the system comprising:
   an autonomous vehicle; and
   one or more processors and a non-transitory computer-readable medium associated with the autonomous vehicle, the non-transitory computer-readable medium having executable instructions encoded thereon such that when executed, the one or more processors perform operations of:
   receiving a set of historical observations X and a set of navigational courses of action Y corresponding to the set of historical observations X;
   estimating a conditional density P(Y|X) between the set of historical observations X and the set of navigational courses of action Y;
   clustering the set of historical observations X according to the P(Y|X), thereby obtaining a plurality of observational clusters;
   merging the observational clusters to determine a causal partition having corresponding causal features which map to various navigational courses of action;
   mapping a new observation to the causal partition and computing a ranking of navigational courses of action for the new observation;
   providing a visualization of the causal features and the ranking of navigational courses of actions corresponding to the new observation to a display; and
   causing the autonomous vehicle to perform a physical maneuver corresponding to a highest rank navigational course of action.

2. The system as set forth in claim 1, wherein the causal partition is determined by refining a set of decision boundaries via user feedback on potential causal features to derive the causal features for ranking the navigational courses of action.

3. The system as set forth in claim 1, wherein the causal partition is determined by refining a set of decision boundaries about a relationship between the set of observed data X and the set of navigational courses of action Y.

4. The system as set forth in claim 1, wherein the causal partition comprises a plurality of partition cells, and wherein the one or more processors further perform an operation of providing the visualization of the causal features which characterize each partition cell.

5. The system as set forth in claim 1, wherein the visualization comprises a graphical display of causal importance of the causal features.

6. The system as set forth in claim 5, wherein the graphical display comprises a plurality of pictographs representing the causal features.

7. A computer implemented method for generating and displaying decision recommendations, the method comprising an act of:
causing one or more processors to execute instructions encoded on one or more associated memories, each associated memory being a non-transitory computer-readable medium associated with an autonomous vehicle, such that upon execution, the one or more processors perform operations of:
   receiving a set of historical observations X and a set of navigational courses of action Y corresponding to the set of historical observations X;
   estimating a conditional density P(Y|X) between the set of historical observations X and the set of navigational courses of action Y;
   clustering the set of historical observations X according to the P(Y|X), thereby obtaining a plurality of observational clusters;
   merging the observational clusters to determine a causal partition having corresponding causal features which map to various navigational courses of action;
   mapping a new observation to the causal partition and computing a ranking of navigational courses of action for the new observation;
   providing a visualization of the causal features and the ranking of navigational courses of actions corresponding to the new observation to a display; and
   causing the autonomous vehicle to perform a physical maneuver corresponding to a highest rank navigational course of action.

8. The method as set forth in claim 7, wherein the causal partition is determined by refining a set of decision boundaries via user feedback on potential causal features to derive the causal features for ranking the navigational courses of action.

9. The method as set forth in claim 7, wherein the causal partition is determined by refining a set of decision boundaries about a relationship between the set of observed data X and the set of navigational courses of action Y.

10. The method as set forth in claim 7, wherein the causal partition comprises a plurality of partition cells, and wherein the one or more processors further perform an operation of providing the visualization of the causal features which characterize each partition cell.

11. The method system as set forth in claim 7, wherein the visualization comprises a graphical display of causal importance of the causal features.

12. A computer readable product for generating and displaying decision recommendations, the computer readable product comprising a non-transitory computer-readable medium associated with an autonomous vehicle having computer-readable instructions stored thereon, wherein the computer-readable instructions are executable by a computer having one or more processors for causing the processor to perform operations of:
   receiving a set of historical observations X and a set of navigational courses of action Y corresponding to the set of historical observations X;
   estimating a conditional density P(Y|X) between the set of historical observations X and the set of navigational courses of action Y;
   clustering the set of historical observations X according to the P(Y|X), thereby obtaining a plurality of observational clusters;
   merging the observational clusters to determine a causal partition having corresponding causal features which map to various navigational courses of action;
   mapping a new observation to the causal partition and computing a ranking of navigational courses of action for the new observation;

providing a visualization of the causal features and the ranking of navigational courses of actions corresponding to the new observation to a display; and causing the autonomous vehicle to perform a physical maneuver corresponding to a highest rank navigational course of action.

13. The computer readable product as set forth in claim 12, wherein the causal partition is determined by refining a set of decision boundaries via user feedback on potential causal features to derive the causal features for ranking the navigational courses of action.

14. The computer readable product as set forth in claim 12, wherein the causal partition is determined by refining a set of decision boundaries about a relationship between the set of observed data X and the set of navigational courses of action Y.

15. The computer readable product as set forth in claim 12, wherein the causal partition comprises a plurality of partition cells, and wherein the one or more processors further perform an operation of providing the visualization of the causal features which characterize each partition cell.

16. The computer readable product as set forth in claim 12, wherein the visualization comprises a graphical display of causal importance of the causal features.

17. The computer readable product as set forth in claim 16, wherein the graphical display comprises a plurality of pictographs representing the causal features.

* * * * *